(12) United States Patent
Sung et al.

(10) Patent No.: US 12,363,121 B2
(45) Date of Patent: Jul. 15, 2025

(54) METHOD AND APPARATUS FOR MANAGING USER PROFILE

(71) Applicant: KAKAO CORP., Jeju-si (KR)

(72) Inventors: So Yon Sung, Seongnam-si (KR); Ji Sun Lee, Seongnam-si (KR); Bum Sun Ryu, Seongnam-si (KR); Jee Won You, Seongnam-si (KR); Young Min Park, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 399 days.

(21) Appl. No.: 17/565,451

(22) Filed: Dec. 30, 2021

(65) Prior Publication Data

US 2022/0210159 A1  Jun. 30, 2022

(30) Foreign Application Priority Data

Dec. 31, 2020 (KR) .................. 10-2020-0189664

(51) Int. Cl.
*H04L 67/306* (2022.01)
*H04L 9/40* (2022.01)
*H04L 51/04* (2022.01)

(52) U.S. Cl.
CPC ........ *H04L 63/102* (2013.01); *H04L 63/0823* (2013.01); *H04L 67/306* (2013.01); *H04L 51/04* (2013.01)

(58) Field of Classification Search
CPC . H04L 63/102; H04L 63/0823; H04L 67/306; H04L 51/104
See application file for complete search history.

(56) References Cited

U.S. PATENT DOCUMENTS 10,069,914 B1 * 9/2018 Smith .................... H04L 67/568
10,659,299 B1 * 5/2020 Winters .................. H04L 67/12
(Continued)

FOREIGN PATENT DOCUMENTS

CA       3125064 A1 *  9/2020  .......... G06F 21/604
JP       2003-316708 A  11/2003
(Continued)

OTHER PUBLICATIONS

Masayuki Numao et al., "Security and Privacy for Attribute-based Dynamic Community Creation," IPSJ Journal, 2004, pp. 103-110, vol. 45, No. 1, English abstract.
(Continued)

*Primary Examiner* — Khanh Q Dinh
(74) *Attorney, Agent, or Firm* — CANTOR COLBURN LLP

(57) ABSTRACT

Disclosed are a method and an apparatus for managing a user profile. A user profile management method performed by a server according to an example embodiment includes creating a public profile corresponding to a first user account, creating a chatroom in which a participation permission option related to certificate information is set so as to correspond to the public profile of the first user account, confirming a participation right of a second user account that requests the participation in the chatroom, based on the participation permission option, and allowing the second user account whose participation right is confirmed to participate in the chatroom.

18 Claims, 15 Drawing Sheets

(56) References Cited

U.S. PATENT DOCUMENTS

| | | | |
|---|---|---|---|
| 2011/0145570 A1* | 6/2011 | Gressel | H04L 63/0823 713/159 |
| 2013/0073473 A1* | 3/2013 | Heath | G06Q 30/0241 705/319 |
| 2014/0171179 A1* | 6/2014 | Ball | G07F 17/32 463/25 |
| 2014/0173644 A1* | 6/2014 | Ball | G06Q 10/00 725/45 |
| 2014/0173648 A1* | 6/2014 | Ball | H04N 21/4882 725/104 |
| 2016/0014109 A1* | 1/2016 | Antunes | H04L 63/0884 726/9 |
| 2017/0011175 A1* | 1/2017 | Cocks | G16H 80/00 |
| 2018/0373887 A1* | 12/2018 | Smith | G06F 21/6227 |
| 2019/0028844 A1* | 1/2019 | Annett | H04W 4/14 |
| 2019/0292122 A1* | 9/2019 | Corthals | C07C 5/333 |
| 2020/0167699 A1* | 5/2020 | Cohen | H04L 51/52 |
| 2020/0374286 A1* | 11/2020 | Agarwal | G06V 40/20 |
| 2020/0374364 A1* | 11/2020 | Bedoe | H04L 67/306 |
| 2021/0006870 A1* | 1/2021 | Navin | H04N 21/443 |
| 2021/0160339 A1* | 5/2021 | Salimi Jazi | H04L 61/5007 |

FOREIGN PATENT DOCUMENTS

| | | |
|---|---|---|
| JP | 2020-96244 A | 6/2020 |
| KR | 20140004601 A | 1/2014 |
| KR | 20160006211 A | 1/2016 |
| KR | 10-1654261 B1 | 9/2016 |

OTHER PUBLICATIONS

Japanese Office Action for JP Application No. 2021-214828 mailed on Jan. 17, 2023.
Korean Office Action for KR Application No. 10-2020-0189664 mailed on Sep. 6, 2022.
International Search Report; International Application No. KR 10-2023-0065811; Date of mailing: Jan. 4, 2024; 7 pages. Machine Translated.

* cited by examiner

METHOD AND APPARATUS FOR MANAGING USER PROFILE

CROSS-REFERENCE TO RELATED APPLICATION

This application claims the benefit of Korean Patent Application No. 10-2020-0189664 filed on Dec. 31, 2020, in the Korean Intellectual Property Office, the entire disclosure of which is incorporated herein by reference for all purposes.

BACKGROUND

1. Field of the Invention

The following example embodiments relate to a method and apparatus for managing a user profile.

2. Description of the Related Art

Recently, with the development of mobile smart devices, the use of online platform services for interaction with other users is being increased. As a representative example of the online platform services for interaction with other users, there are a social networking service (SNS) which is an online platform of creating and enhancing social relationships through communication, information sharing, and personal connection expansion between users and an instant messaging service (IMS) which is an online platform for real-time content communication between two or more users.

In the service such as SNS and IMS, a profile is used to share personal information to identify the user, such as a name or a picture of the user, with the other users. The profile may be used in various ways as the means of expressing the user itself, but the profile includes personal information so that it is necessary to prevent the profile front being imprudently exposed to other people.

SUMMARY

According to an aspect, the user profile management method is a user profile management method which is performed in a server including: creating a public profile corresponding to a first user account, the public profile including certificate information corresponding to the first user account; creating a chatroom in which a participation permission option related to the certificate information is set so as to correspond to the public profile of the first user account; confirming a participation right of a second user account that requests the participation in the chatroom, based on the participation permission option, and allowing the second user account whose participation right is confirmed to participate in the chatroom.

The public profile may include anonymous information corresponding to the first user account.

The participation permission option may include at least one of an option of permitting participation with a public profile including the certificate information and an option of permitting participation with an arbitrary profile.

The second user account whose participation right is confirmed may participate in the chatroom with a profile corresponding to the participation permission option, among the at least one profile corresponding to the second user account.

When the participation permission option is the option of permitting participation with a public profile including the certificate information, the confirming of a participation right of a second user account may include: confirming the participation right by checking whether at least one public profile corresponding to the second user account includes the certificate information.

The allowing of the second user account to participate in the chatroom may include: allowing the second user account to participate in the chatroom, based on a public profile corresponding to the second user account including the certificate information as the public profile corresponding to the second user account includes the certificate information.

The creating of the public profile may further include: adding an interfacing object indicating that the public profile is certified to a user interface on which the public profile is displayed.

The certificate information may include at least one of certified identity information, certified qualification information, and certified affiliation information.

According to an aspect, the user profile management method is a user profile management method which is performed in a server including: creating a public profile corresponding to a first user account, the public profile including certificate information corresponding to the first user account; receiving a search request based on the certificate information from a second user terminal logged in with a second user account; confirming a search right of the second user account for the public profile, based on a search permission option related to certificate information set in the public profile, and providing the public profile to the second user terminal as the search right of the second user account s confirmed.

The user profile management method may further include receiving a chatting request with the first user account from the second user terminal, based on the public profile; and creating a chatroom including the first user account and the second user account based on the chatting request.

The first user account may participate in the chatroom with the public profile.

The user profile management method may further include receiving an input for at least one tag related to the certificate information from the first user terminal logged in with the first user account; and adding the input tag to the public profile.

The receiving of a search request based on the certificate information may include receiving a request for searching the tag which is added to the public profile.

The search permission option may include at least one of an option of permitting the search by arbitrary another user account and an option of permitting the search by another user account corresponding to the certificate information.

According to an aspect, the user profile management method is a user profile management method performed in a user terminal which is logged in with a user account including: requesting a server to create a public profile including certificate information corresponding to the user account: setting a search permission option related to the certificate information to the public profile; and setting a participation permission option relating to the certificate information to a chatroom created using the public profile.

The requesting of creation of a public profile may include: performing certification to prove an identity corresponding to the user account through the server; and requesting the server to create a public profile including the certified identity information based on the certification.

The requesting of creation of a public profile may include: performing certification to prove a qualification corresponding to the user account through the server; and requesting the server to create a public profile including the certified qualification information based on the certification.

The requesting of creation of a public profile may include: performing certification to prove an affiliation corresponding to the user account through the server: and requesting the server to create a public profile including the certified affiliation information based on the certification.

According to an aspect, the server includes at least one processor configured to create a public profile corresponding to a first user account, the public profile including certificate information corresponding to the first user account, create a chatroom in which a participation permission option related to the certificate information is set so as to correspond to the public profile of the first user account, confirm a participation right of a second user account that requests the participation in the chatroom, based on the participation permission option, and allow the second user account whose participation right is confirmed to participate in the chatroom.

According to an aspect, the server includes at least one processor configured to create a public profile corresponding to a first user account, the public profile including certificate information corresponding to the first user account, receive a search request based on the certificate information from a second user terminal logged in with a second user account, confirm a search right of the second user account for the public profile, based on a search permission option related to certificate information set in the public profile, and provide the public profile to the second user terminal as the search right of the second user account is confirmed.

According to an aspect, the user terminal is a user terminal which is logged in with a user account, including at least one processor configured to request a server to create a public profile including certificate information corresponding to the user account, set a search permission option related to the certificate information to the public profile, and set a participation permission option relating to the certificate information to a chatroom created using the public profile.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
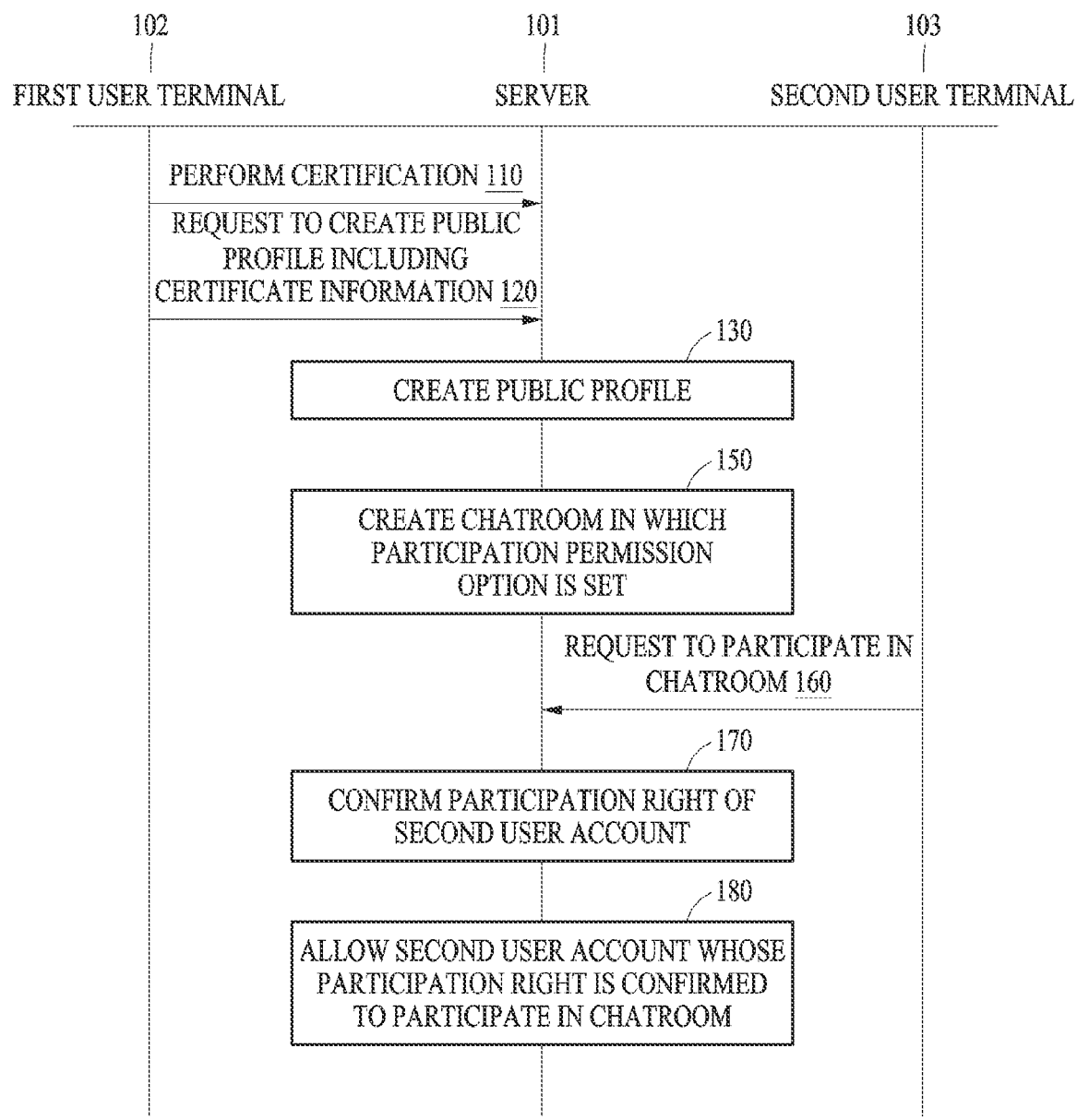
FIG. 1 is a view for explaining a user profile management method for participation in a chartroom according to an example embodiment.

Specific structural or functional descriptions for example embodiments are provided for the purpose of illustration only and may be changed in various forms to be implemented. Accordingly, an actually implemented form is not limited only to the specific disclosed example embodiment and the scope of the present specification includes changes, equivalents, or substitutes included in a technical spirit described in the example embodiments.

Even though the terms of first or second are used to describe various components, the terms should be interpreted only to distinguish one component from the other component. For example, a first component may be referred to as a second component, and similarly, a second component may be referred to as a first component.

It should be understood that, when it is described that an element is "connected" to another element, the element may be directly coupled or directly connected to the other element or coupled or connected to the other element through a third element.

A singular form may include a plural form if there is no clearly opposite meaning in the context. In the present specification, it should be understood that terms "include" or "have" indicates that a feature, a number, a step, an operation, a component, a part or the combination thoseof described in the specification is present, but do not exclude a possibility of presence or addition of one or more other features, numbers, steps, operations, components, parts or combinations, in advance.

Hereinafter, example embodiments will be described in detail with reference to the accompanying drawings. In description with reference to accompanying drawings, the same components are denoted by the same reference numerals regardless of the reference numeral and a duplicated description thereof will be omitted.

FIG. 1 is a view for explaining a user profile management method for participation in a chatroom according to an example embodiment.

A server 101 according to an example embodiment may include a server which provides instant messaging services or social networking services. The server 101 may serve as a service platform for communication between user terminals which are connected or accessed to the server 101.

A first user terminal 102 and a second user terminal 103 according to an example embodiment are one of the electronic devices such as a computer, a portable computer, a wireless phone, a mobile phone, a smart phone, a personal digital assistant (PDA), and a web tablet and refer to all devices which are capable of installing and executing a service application related to the server 101. At this time, the first user terminal 102 and the second user terminal 103 may perform an overall operation for services such as configuration of a service screen, data input, data transmission/reception, or data storage under the control of an application and may access the server 101 through an application.

The user may create a user account by subscribing to a service provided by the server 101 and log in with a user account using the user terminal to use the service. The server 101 may provide a service corresponding to the user account to the user terminal logged in with the user account. According to an example embodiment, the first user terminal 102 may correspond to a terminal logged in with a first user account created when the first user subscribes to a service provided by the server 101 and the second user terminal 103 may correspond to a terminal logged in with a second user account created when the second user subscribes to the service provided by the server 101.

The service provided by the server 101 according to the example embodiment provides various types of user profiles corresponding to the user account to improve the usability of the user profile in the service. The server 101 which provides the service and the user terminal logged in with the user account subscribed to the service may perform a profile management method for a profile in a type which is differentiated from a default profile.

Referring to FIG. 1, a user profile providing method performed in the server 101 according to the example embodiment may include a step 130 of creating a public profile corresponding to a first user account, a step 150 of creating a chatroom in which a participation permission option related to certificate information is set so as to correspond to the public profile of the first user account, a step 170 of confirming a participation right of a second user account that requests the participation in the chatroom, based on the participation permission option, and a step 180 of allowing the second user account whose participation right is confirmed to participate in the chatroom.

A user profile or a profile according to the example embodiment is created so as to correspond to a user account subscribed to the service provided by the server 101 and may include identification information corresponding to a user account such as a profile name, a profile photo, and an introduction message according to a user's setting. According to the example embodiment, a profile corresponding to a single user account may include two or more profiles. In the plurality of profiles, at least some of the identification information included in each profile may be different. For example, a profile name included in the first profile, among the plurality of profiles corresponding to the same account, may be different from a profile name included in a second profile and among the plurality of profiles corresponding to the same account, a profile photo included in the first profile may be different from a profile photo included in a third profile.

A profile corresponding to the user account may be divided into a plurality of types. For example, the profile may be classified into a private profile and an open profile depending on an audience of the profile. The audience of the profile is allowed to search identification information included in the profile and for example, the private profile may correspond to a profile which is open to the other user account in a predetermined relationship (for example, friends or subscribers) with the user account. For example, the user account may form a predetermined relationship with the other user account by registering a contact or an ID of the other user account. According to the example embodiment, the private profile may be open only to the other user account in a predetermined relationship with the user account by registering the contact or the ID of the user account. In the meantime, the open profile does not limit the audiences and the open profile corresponding to the user account may be also open to the other user account which is not in a predetermined relationship with the user account. According to the example embodiment, unlike the private profile, the open profile may be unlimitedly searched through a profile search interface which is provided by various services, such as instant messaging services or social network services.

The open profile may include anonymous information corresponding to the user account. The anonymous information refers to information which does not identify an individual and may be distinguished from real-name information which identifies an individual. For example, the real-name information may include a real-name of an individual, a phone number owned with the real-name, an e-mail address owned with the real-name and the anonymous information may include a nick-name which is arbitrarily set by the individual. When the open profile includes anonymous information, it means that real-name information is not necessary to set up the open profile so that the open profile may be set up to include real-name information depending on the user's choice.

The public profile corresponds to an open profile and may refer to a certified profile including certificate information corresponding to the user account, among the open profiles. The certificate information may be acquired based on the certification on the user account. The certification on the user account may include certification on identity, qualification, or affiliation and to be more specific, include certification to prove identity such as real-name, a status, a position, an address, or a job, certification to prove a specific qualification, and certification to prove a specific affiliation.

The certificate information may include certified identity information, certified qualification, and certified affiliation information acquired based on the certification on the identity, qualification, and affiliation corresponding to the user account. The certificate information corresponding to the user account may include information proving identity such as of a user who is a natural person who creates the user account, a user's qualification, and affiliation of an organization or a group to which the user belongs. For example, the certificate information may include information certifying that the user is an adult, information certifying a job of the user, information certifying that the user resides in a specific area, information certifying that the user has a specific qualification, information certifying that the user is a student at a specific school, information certifying that the user is a member of a specific organization, and information certifying the user's real name.

Figure 2:
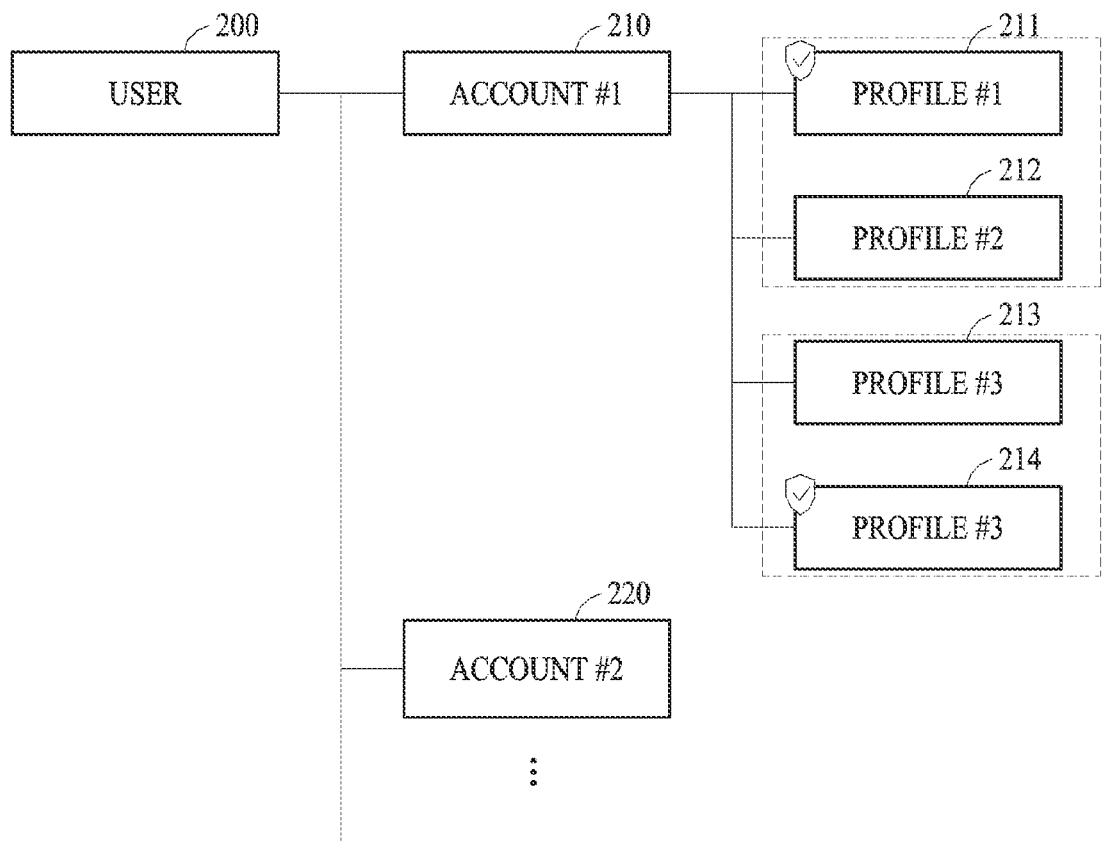
FIG. 2 is a view illustrating a structure of a user, a user account, and a profile according to an example embodiment.

For example, referring to FIG. 2, the user 200 may create at least one user account 210 and 220 corresponding to the service and create a plurality of profiles 211, 212, 213, 214 corresponding to the accounts 210 and 220. The plurality of profiles 211, 212, 213, and 214 may be classified into private profiles or open profiles. For example, the profile corresponding to the first account 210 may include a first profile 211 and a second profile 212 corresponding to private profiles and include a third profile 213 and a fourth profile 214 corresponding to open profiles.

According to the example embodiment, the profile corresponding to the user account may include certified profiles 211 and 214 including certificate information. The private profiles include real-name information and among the private profiles, a certified profile 211 may correspond to a self-certified profile, and the self-certified profile 211 may include certified real-name information. Among the open profiles, a certified profile 214 may correspond to a public profile.

According to the example embodiment, the user interface UI on which the certified profiles 211 and 214 are displayed may include an interfacing object indicating that the corresponding profile is certified. Hereinafter, the user interface is simply referred to as an interface or a UI. The interfacing object is a configuration which is implemented to interact with the user in the interface and for example, may include a button and the like implemented to be switched to another screen by a click input of the user. The interfacing object added to the UI of the profile will be described in detail below.

Referring to FIG. 1 again, the first user terminal 102 logged in with the first user account may request (120) the server 101 to create a public profile including certificate information corresponding to the first user account. The step 120 of requesting the creation of a public profile according to the example embodiment may further include a step 110 of performing certification corresponding to the first user account through the server 101. For example, the first user terminal 102 may perform (110) certification to prove an identity corresponding to the first user account, certification to prove qualification corresponding to the user account, and/or certification to prove an affiliation corresponding to the user account. Further, the first user terminal 102 may request (120) the server 101 to create a public profile including certified identity information, certified qualification information, and/or certified affiliation information based on the certification, as the certification corresponding to the first user account is performed.

The server 101 according to the example embodiment may create (130) a public profile corresponding to the first user account in response to the request of creation of the public profile received from the first user terminal 102 and the created public profile may include certificate information corresponding to the first user account.

The step 130 of creating a public profile according to the example embodiment may further include a step of adding an interfacing object indicating that the first user account is certified to the created public profile. The interfacing object added to the public profile including the certificate information will be described in detail below.

According to the example embodiment, the server 101 may create (150) a chatroom in which a participation permission option is set, so as to correspond to the public profile of the first user account. To be described in detail below, the operation of creating the chatroom in which the participation permission option is set may be understood as a concept collectively including an operation of applying a participation permission option set before creating the chatroom when the chatroom is created, an operation of setting the participation permission option together with the creation of the chartroom, and an operation of setting a participation permission option after creating the chartroom ex-post facto.

The participation permission option according to the example embodiment is a condition for a profile which is allowed to participate in the chatroom and for example, may include at least one of an option of permitting participation with a public profile including specific certificate information, an option of permitting participation with a specific type of profile, and an option of permitting participation with an arbitrary profile.

For example, when as the participation permission option of the chatroom, an option of participating with a public profile including specific certificate information is set, the specific certificate information may correspond to certificate information included in the public profile used to create the chatroom. For example, when the public profile used to create the chatroom includes information certifying a student of school A, as a participation permission option, an option of permitting the participation with a public profile including information certifying a student of school A may be set to the chatroom.

For example, when as the participation permission option of the chatroom, an option of permitting the participation with a specific type of profile is set, the specific type may correspond to a type of a profile used to create the chatroom. For example, when the profile used to create the chatroom is a public profile, as the participation permission option of the chatroom, an option of permitting the participation with a public profile including arbitrary certificate information or a self-certified profile may be set.

For example, as the chatroom participation permission option, an option of permitting the participation with an arbitrary profile is set, a condition for the profile such as a type of a profile which can participate in the chatroom or certificate information included in the profile is not limited and another user account which wants to participate in the chatroom may participate in the chatroom with an arbitrary profile.

A participation permission option may be set in various methods. For example, the participation permission option may be set in advance by means of a public profile before creating a chatroom corresponding to the public profile. In this case, when a chatroom corresponding to the public profile is created, a predetermined participation permission option may be automatically applied through the corresponding public profile.

Alternatively, the participation permission option may be set when a chatroom corresponding to the public profile is created. For example, the first user terminal 102 may request the server 101 to create the chatroom using a public profile corresponding to the first user account and set a participation permission option related to certificate information included in the public profile to the corresponding chatroom.

Alternatively, the participation permission option may be set after creating a chatroom corresponding to the public profile. For example, the first user terminal 102 may set the participation permission option of the previously created chatroom in response to the public profile ex-post facto.

According to the example embodiment, the chatroom corresponding to the public profile of the first user account may be created upon the request of the first user terminal 102. For example, the first user terminal 102 may request the server 101 to create a chatroom using an interface provided through the public profile of the first user terminal.

Alternatively, the chatroom corresponding to the public profile of the first user account may be created upon the request of the second user terminal 103. For example, the second user terminal 103 may request the server 101 to create a chatroom using an interface (for example, 430 in FIG. 4) provided through the public profile of the first user account.

The server 101 may create a chatroom corresponding to the public profile of the first user account according to the request of the first user terminal 102 or the second user terminal 103.

The server 101 according to the example embodiment may receive (160) a participation request of the chatroom created in the step 150 from the second user terminal logged in with the second user account and confirm (170) a participation right of the second user account in the chatroom in response to the participation request.

For the convenience of description, even though in the drawing, the step 160 is illustrated after the step 150, when the chatroom corresponding to the public profile of the first user account is created by the request of the second user terminal, the step 160 may precede the step 150.

The server 101 may confirm 170 the participation right of the second user account based on the participation permission option set in the chatroom. The participation right of the second user account may be determined to be present when among the profiles corresponding to the second user account, there is a profile which satisfies the participation permission option.

The server 101 may allow the second user account whose participation right is confirmed to participate in the chatroom (180) and may not allow a second user account whose participation right in the chatroom is not confirmed to participate in the chartroom. The second user account whose participation right in the chatroom is confirmed may participate in the chatroom with a public profile corresponding to the participation permission option, among at least one public profile corresponding to the second user account. According to the example embodiment, when there is a plurality of public profiles of the second user account corresponding to the participation permission option, the second user account may participate in the chatroom with any one of the plurality of public profiles corresponding to the participation permission option.

According to the example embodiment, when the participation permission option set in the chatroom is an option which permits the participation with a public profile including specific certificate information, the server 101 may confirm the participation right of the second user account by checking whether at least one public profile corresponding to the second user account includes specific certificate information. At this time, when at least one public profile corresponding to the second user account includes specific certificate information, it may be determined that the second user account has a participation right for the chartroom and when there is no profile including the specific certificate information among the public profile(s) corresponding to the second user account, it may be determined that the second user account does not have a participation right for the chatroom.

According to the example embodiment, when the participation permission option set in the chatroom is an option to permit the participation with a public profile including specific certificate information, as the public profile corresponding to the second user account includes the specific certificate information, the server 101 may allow the second user account to participate in the chatroom, based on the public profile corresponding to the second user account including the specific certificate information. In other words, the second user account may participate in the chatroom with the public profile including the specific certificate information.

For example, when as the participation permission option in the chatroom, an option of permitting the participation with a public profile including information certifying a student of school A is set, if the user account which requests the participation in the chatroom has a public profile including information certifying the student of school A, the right to participate in the chatroom is confirmed so that it is possible to participate in the chatroom with the public profile including information certifying the student of school A. In the meantime, when a public profile corresponding to a user account which requests the participation in the chatroom includes information certifying a student at school B, if there is no public profile including information certifying the student of school A, the participation right is not confirmed so that the user cannot participate in the chatroom.

Figure 3:
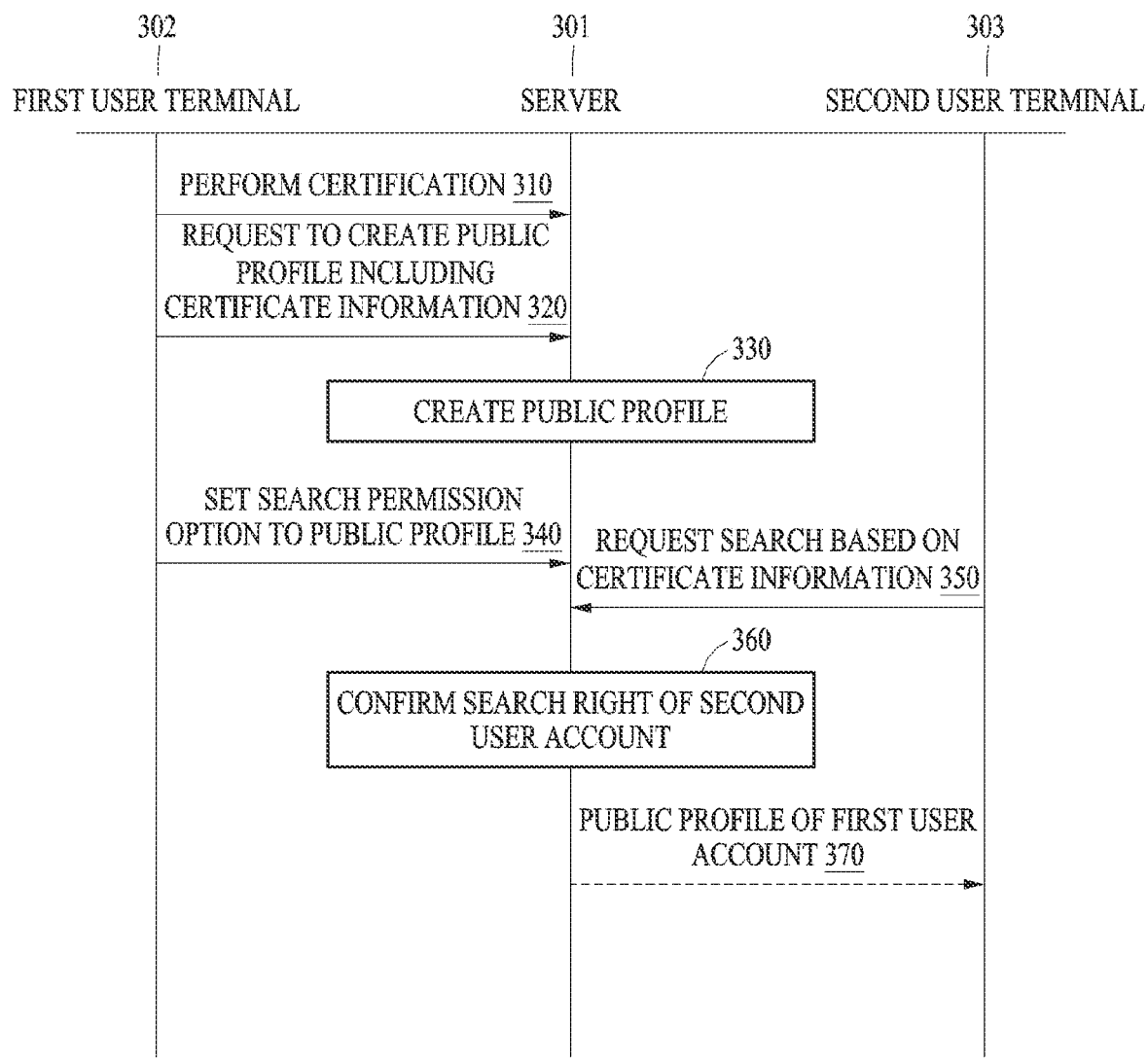
FIG. 3 is a view for explaining a user profile management method for a search according to an example embodiment.

FIG. 3 is a view for explaining a user profile management method for a search according to an example embodiment.

Referring to FIG. 3, a server 301, a first user terminal 302, and a second user terminal 303 may correspond to the first server 101, the first user terminal 102, and the second user terminal 103 described in detail above with reference to FIG. 1.

A user profile providing method performed in the server 301 according to the example embodiment may include a step 330 of creating a public profile corresponding to a first user account, a step 350 of receiving a search request based on certificate information from the second user terminal 303, a step 360 of confirming a search right of the second user account for the public profile, based on a search permission option related to certificate information set in the public profile, and a step 370 of providing a public profile corresponding to the first user account to the second user terminal as the search right of the second user account is confirmed.

The steps 310 to 330 according to the example embodiment may correspond to the steps 110 to 130 described in detail with reference to FIG. 1. The first user terminal 302 may set (340) a search permission option to a public profile corresponding to the first user account. The search permission option may be set after creating the public profile or set at the time of request of creating a public profile. In other words, even though in FIG. 3, the step 340 is illustrated after the step 330, the step 340 is not necessarily performed after the step 330, but may be performed during the step 320 of requesting the creation of the public profile.

The search permission option according to the example embodiment is a condition for a target to which the public profile is provided as a search result, and for example, may include at least one of an option of permitting the search by another user account corresponding to specific certificate information, an option of permitting the search by another user account having a specific type of profile, and an option of permitting the search by arbitrary another user account. Another user account corresponding to the specific certificate information may refer to another user account having a public profile including specific certificate information.

For example, when as the search permission option of the public profile, an option of permitting the search by another user account corresponding to specific certificate information is set, the specific certificate information may correspond to certificate information included in the corresponding public profile. For example, when the public profile includes information certifying a student of school A, an option permitting to search the profile by another user account having a public profile including information certifying a student of school A may be set to the corresponding public profile as the search permission option.

For example, when as the search permission option of the public profile, an option of permitting the search by another user account having a specific type of profile is set, the specific type may correspond to a a type of profile including the certificate information. For example, the search permission option of the public profile may be set to be searched by another user account having a public profile including arbitrary certificate information and set to be searched by another user account having a self-certified profile.

For example, when as the search permission option of the public profile, an option of permitting to be searched by arbitrary another user account is set, another user account to which the public profile is provided as a search result is not limited and the corresponding public profile may be provided as a search result in response to the search result based on the certificate information included in the public profile by arbitrary another user account.

The server 301 according to the example embodiment may receive (350) a search request from the second user terminal logged in with the second user account based on specific certificate information. Here, the specific certificate information may correspond to certificate information included in the public profile corresponding to the first user account. The search request based on the specific certificate information may refer to the request for searching of public profile(s) including specific certificate information, among public profiles corresponding to user accounts subscribed to a service.

According to the example embodiment, the step 350 of receiving a search request based on certificate information may include a step of receiving a request to search a tag added to the public profile corresponding to the first user account.

A tag is a text representing a feature of a public profile or a feature related to the certificate information included in the public profile and at least one tag may be added to the public profile corresponding to the user account by the setting of the user account. According to the example embodiment, the tag may include an identifier to be identified as a tag in the server 301 and may be added to the public profile with a format in which an identifier and a text are combined (for example, "#text"). In other words, when the server 301 creates (330) a public profile corresponding to the first user account, the server 301 according to the example embodiment may receive an input for at least one tag related to the certificate information included in the public profile and add the input tag to the public profile.

According to the example embodiment, the tag may serve as a search keyword, and the second user terminal inputs a specific tag in a search window provided from the server 301 to request the server 301 to search for the public profile including the specific tag.

The server 301 may confirm (360) a search right of the second user account for the public profile corresponding to the first user account, in response to the search request received in the second user terminal 303. When among the profiles corresponding to the second user account, there is a profile which satisfies the search permission Option, it may be determined that the second user account has a search right.

When the search right of the second user account is confirmed, the server 301 may provide (370) the public profile corresponding to the first user account to the second user terminal 303 logged in with the second user account as a search result. When the search right of the second user account is not confirmed, the server 301 may not provide the public profile corresponding to the first user account to the second user terminal 303 logged in with the second user account as a search result.

According to the example embodiment, the search result which is provided to the second user terminal 303 by the search request 350 based on the specific certificate information of the second user account may include a public profile whose search right of the second user account is confirmed, among the public profiles including specific certificate information. For example, according to the search permission option of the first public profile including specific certificate information, when the search right of the second user account is not confirmed, the first public profile may not be included in the search result provided to the second user terminal 303. In the meantime, according to the search permission option of the second public profile including specific certificate information, when the search right of the second user account is confirmed, the second public profile may be included in the search result provided to the second user terminal 303.

According to the example embodiment, the second user terminal 303 which is provided with a public profile of the first user account as the search result may be provided with a service based on the public profile of the first user account from the server 301. For example, the server 301 may provide a user interface for the public profile of the first user account to the second user terminal 303 and provide a service based on the public profile through the user interface. For example, the second user terminal 303 may request the server 301 to chat with the first user account based on the public profile of the first user account and the server 301 may create a chatroom including the first user account and the second user account based on the chatting request. At this time, the first user account may participate in the chatroom created with the public profile. A service based on the public profile provided through the UI of the public profile according to the example embodiment will be described in detail below.

Figure 4:
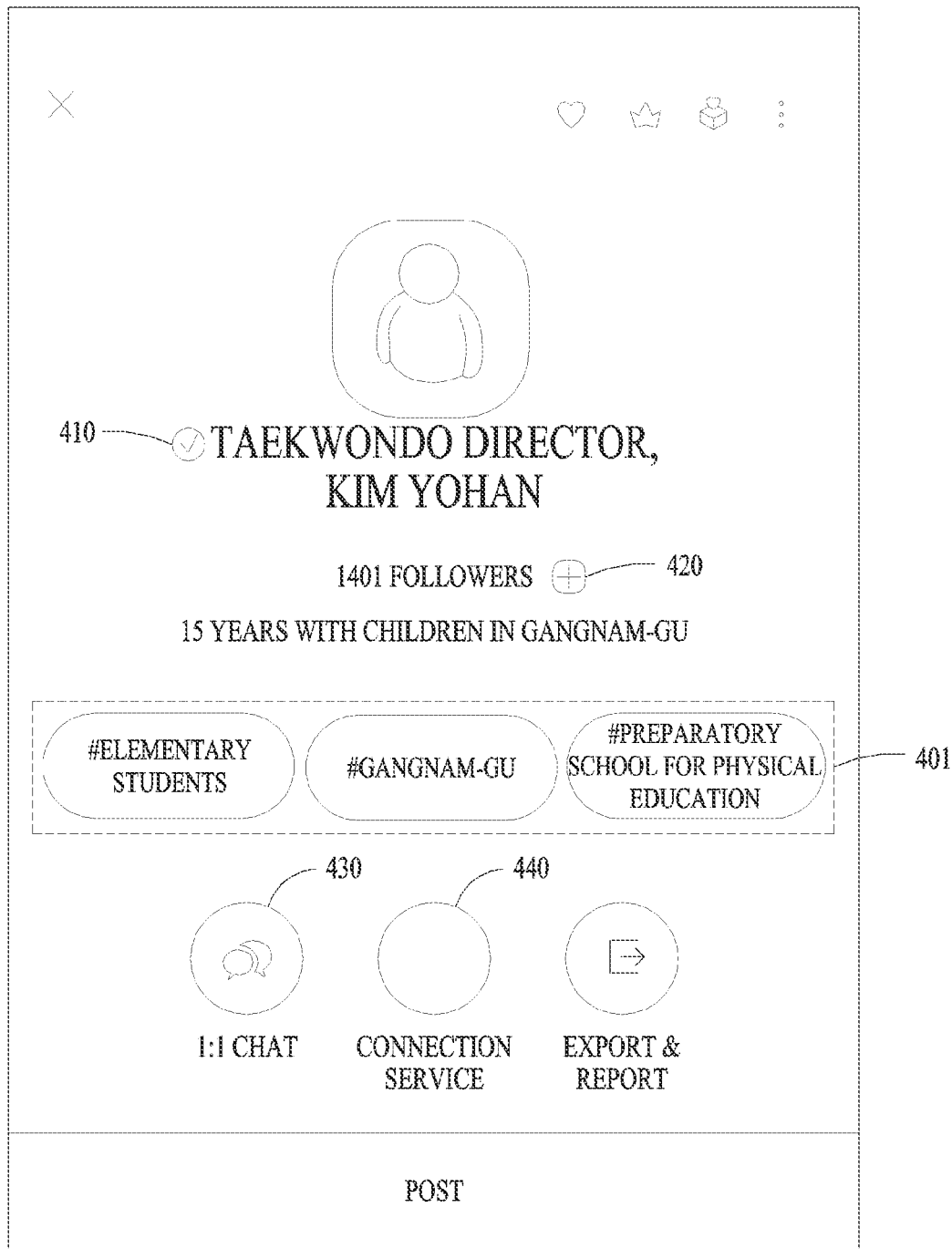
FIG. 4 is a view illustrating a user interface of a public profile provided to a user terminal according to an example embodiment.

FIG. 4 is a view for explaining a user interface of a public profile provided to a user terminal according to an example embodiment. Hereinafter, it is assumed that an interface screen illustrated in FIG. 4 is an interface screen of a first public profile of a first user account provided to the second user terminal.

Referring to FIG. 4, in the user interface of the first public profile provided to the second user terminal, identification information included in the first public profile such as a profile photo, a profile name, and a profile introduction may be displayed. Further, in the UI of the first public profile, tags 401 with a format in which an identifier "#" of the tag and a text representing a feature of the first public profile set by the first user or a feature related to the certificate information included in the first public profile are combined may be displayed.

According, to an example embodiment, the UI of the first public profile may include an interfacing object 410 indicating that the first public profile is certified. According to the example embodiment, the interfacing object 410 may be displayed on the user interface in which a profile is displayed in the form of a visual mark to distinguish a certified profile from a profile which is not certified. The interfacing object 410 is not necessarily limited to being visually displayed, but for example, may be auditorily implemented to output a sound through the interface.

According to the example embodiment, the certificate information included in the first public profile may be displayed on the terminal of the second user by interaction of the interfacing object 410 included in the UI of the first public profile and the second user. For example, when a selective input of the interfacing object 410 is received through the UI of the first public profile from the second user terminal, switching to a UI screen on which the certificate information illustrated in FIG. 5A or 3B is displayed may occur.

Figure 5A:
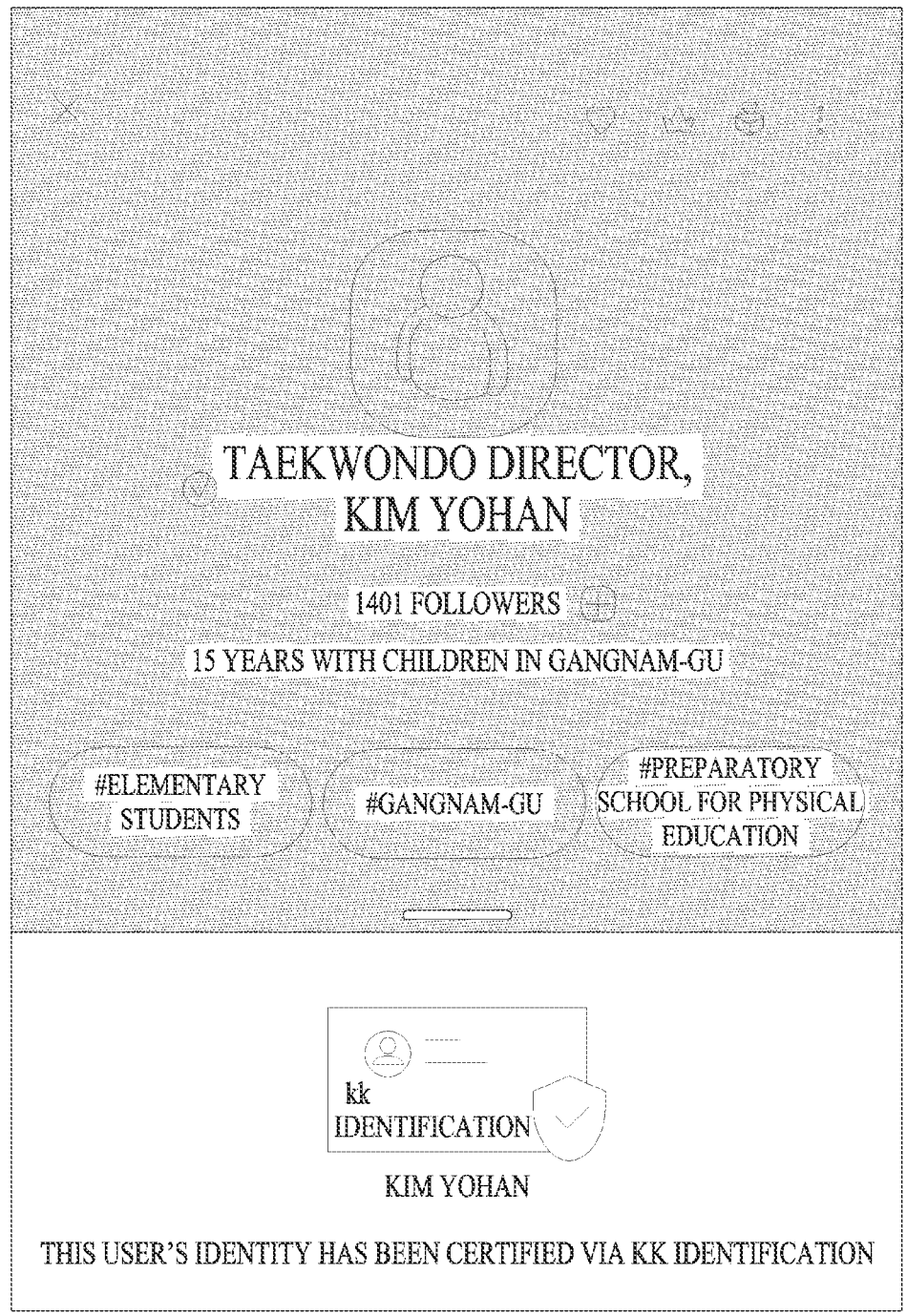
FIGS. 5A and 5B are views illustrating a user interface on which certificate information included in a public profile according to an example embodiment is displayed.
Figure 5B:
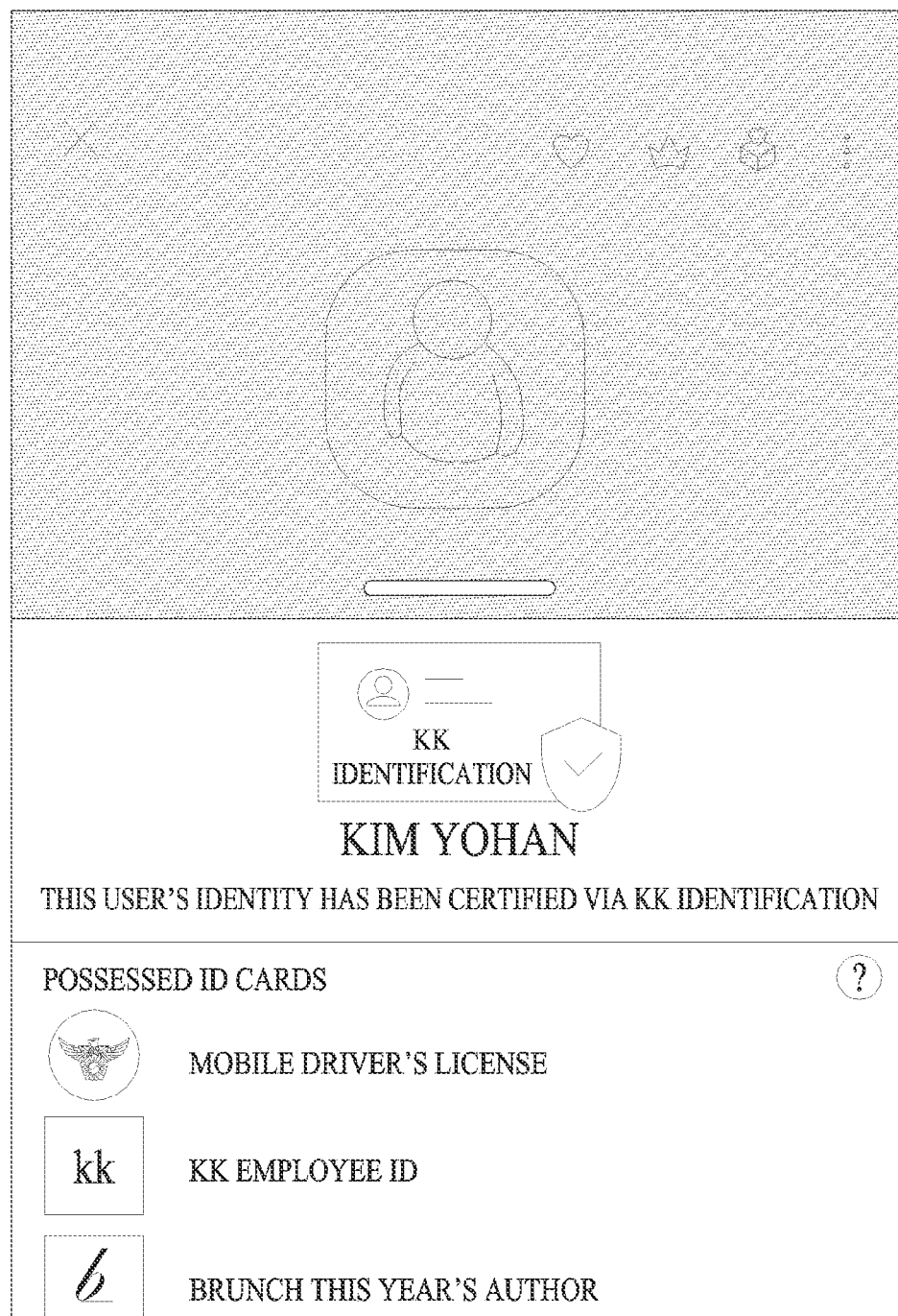

Referring to FIG. 5A, the certificate information included in the first public profile may include information certifying a real-name of the first user and information certifying the real-name of the first user included in the first public profile may be displayed through the UI of the first public profile. Referring to FIG. 5B, the first public profile may include items of a plurality of certificate information corresponding to the first user account and items regarding the certified real-name information, items regarding certified qualification information, and the like included in the first public profile may be displayed on the UI of the first public profile.

Referring to FIG. 4 again, the UI of the first public profile according to the example embodiment may include an interfacing object 420 for following the first public profile. According to the example embodiment, the second user interacts with the interfacing object 420 included in the UI of the first public profile to follow the first public profile with the second user account. For example, the second user selects the interfacing object 420 to request the server to follow the first public profile. According to the example embodiment, when there is a following request of the first public profile by the second user account, the first user account approves the follow to establish the following relationship between the second user account and the first public profile.

Figure 6A:
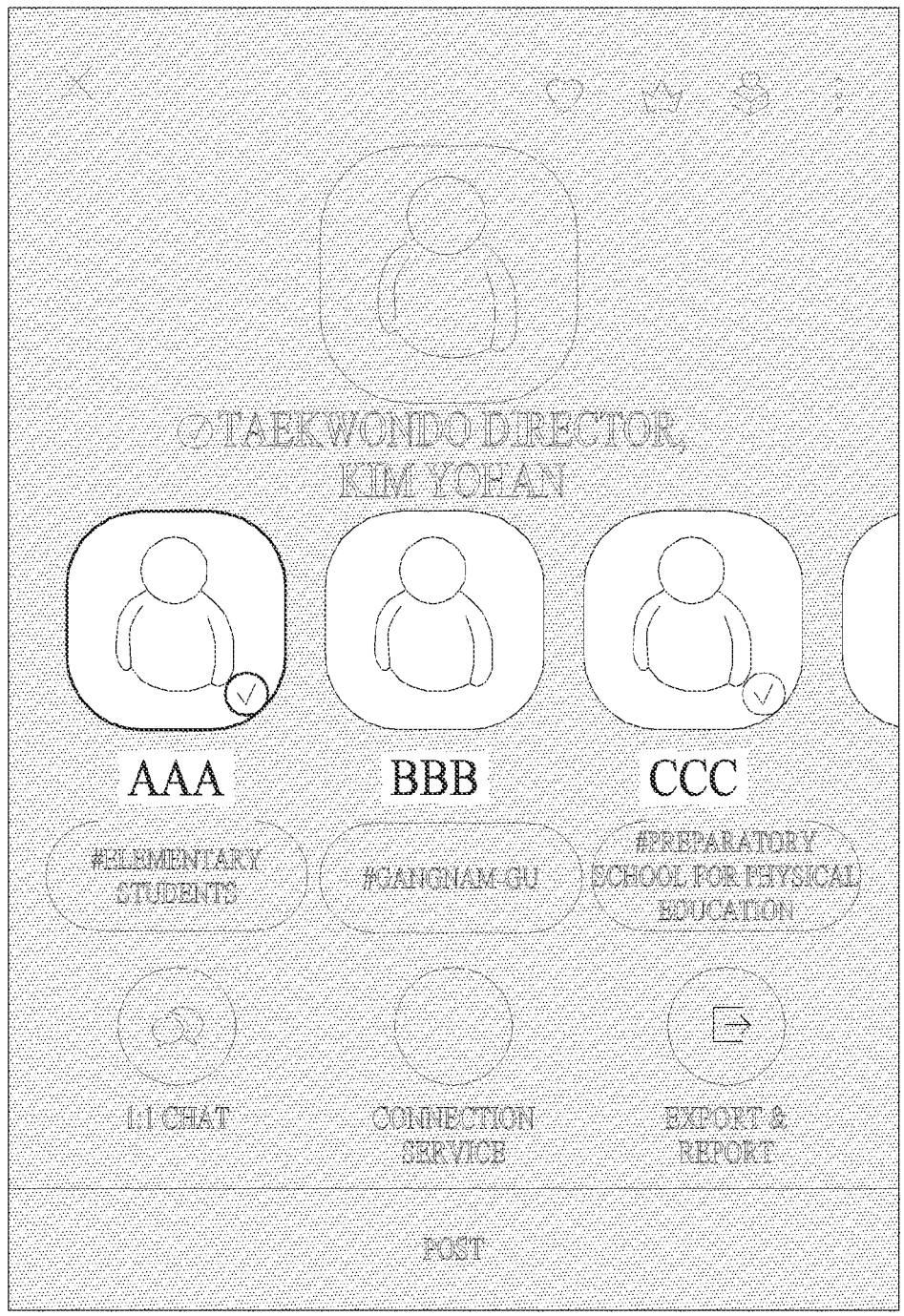
FIGS. 6A to 6C are views illustrating a user interface for the follow of a public profile according to an example embodiment.

According to the example embodiment, when a selective input of the interfacing object 420 is received from the second user terminal, the switching to the UI screen to select a profile of the second user account illustrated in FIG. 6A may occur. The second user may select a profile among the plurality of profiles corresponding to the second user account to follow the first public profile through the UI for selecting a profile of the second user account illustrated in FIG. 6A, According to the example embodiment, the profile of the second user account to follow the first public profile may be limited according to a follow permission option set in the first public profile. For example, the follow permission option may include a condition to limit a profile which is permitted to be followed, such as an option of permitting to follow the first public profile using a certified profile.

Figure 6B:
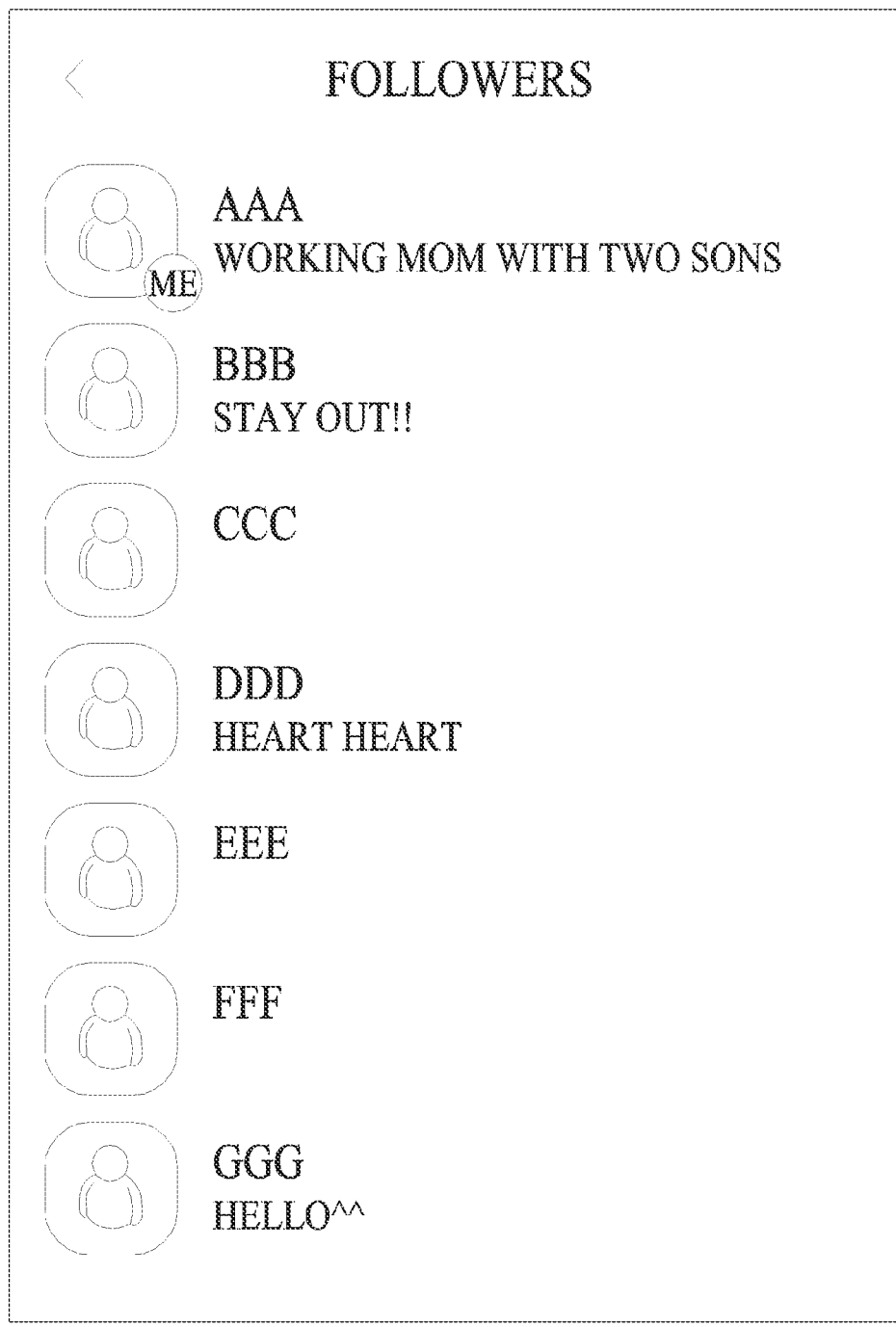

For example, the second user account follows the first public profile, as illustrated in FIG. 6B, a list of profiles of other user accounts which follow the first public profile may be provided to the second user terminal through the UI.

Figure 6C:
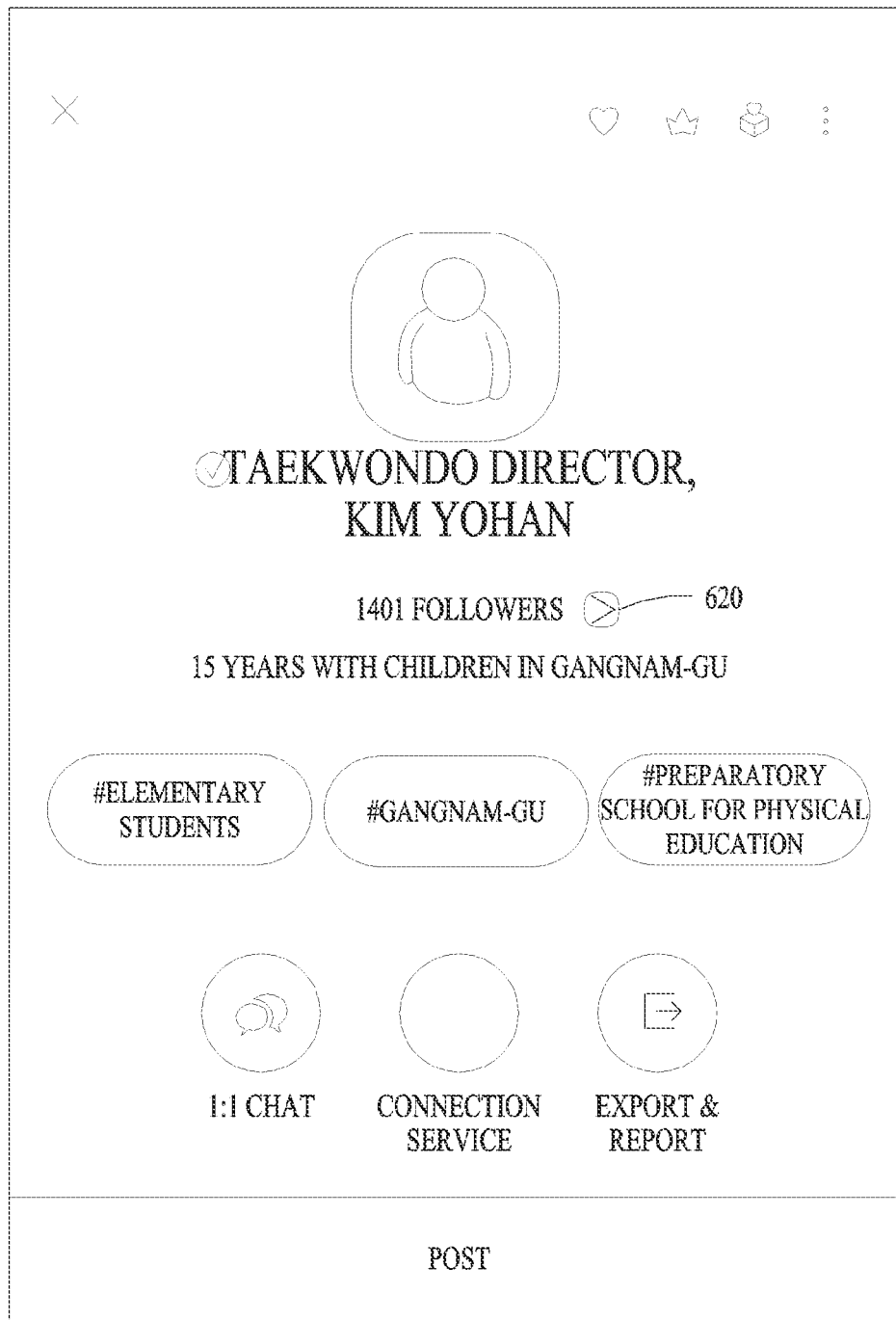

According to the example embodiment, in order to display whether a following relationship between the second user account and the first public profile is established, when the following relationship between the second user account and the first public profile is established, the interfacing object 420 may be displayed to be different from the interfacing object 420 illustrated in FIG. 4. For example, as the following relationship between the second user account and the first public profile is established, the shape of the interfacing object 420 may be changed to a shape of an interfacing object 620 as illustrated FIG. 6C.

Referring to FIG. 4 again, the UI of the first public profile according to the example embodiment may include an interfacing object 430 for requesting a chat with the first public profile. As the second user selects the interfacing object 430, the second user terminal may request the server to chat with the first user account. The server may provide the UI of a chatroom including the first user account and the second user account to the first user terminal and the second user terminal based on the chatting request. The first user account may participate in the chatroom using the first public profile and the second user account selects a profile for participating in the chatroom to participate in the chatroom using the selected profile. On the UI of the chatroom, a profile which is used by each user account included in the chatroom may be disposed so as to correspond to each user account. For example, on the UI of the chatroom, the first public profile may be disposed so as to correspond to the first user account and a profile of the second user account selected to participate in the chatroom may be displayed so as to correspond to the second user account.

The UI of the first public profile according to the example embodiment may include an interfacing object 440 which is connected to a webpage or an application provided through an external service set so as to correspond to the first public profile. As the second user selects the interfacing object 440, the second user terminal may request the server to access the webpage or the application set so as to correspond to the first profile and the server may provide the webpage or the application related to the public profile to the second user terminal based on an access route to the webpage or the application included in the public profile.

Figure 7A:
FIGS. 7A and 7B are views illustrating a user interface for an external webpage set to correspond to a public profile according to an example embodiment.
Figure 7B:
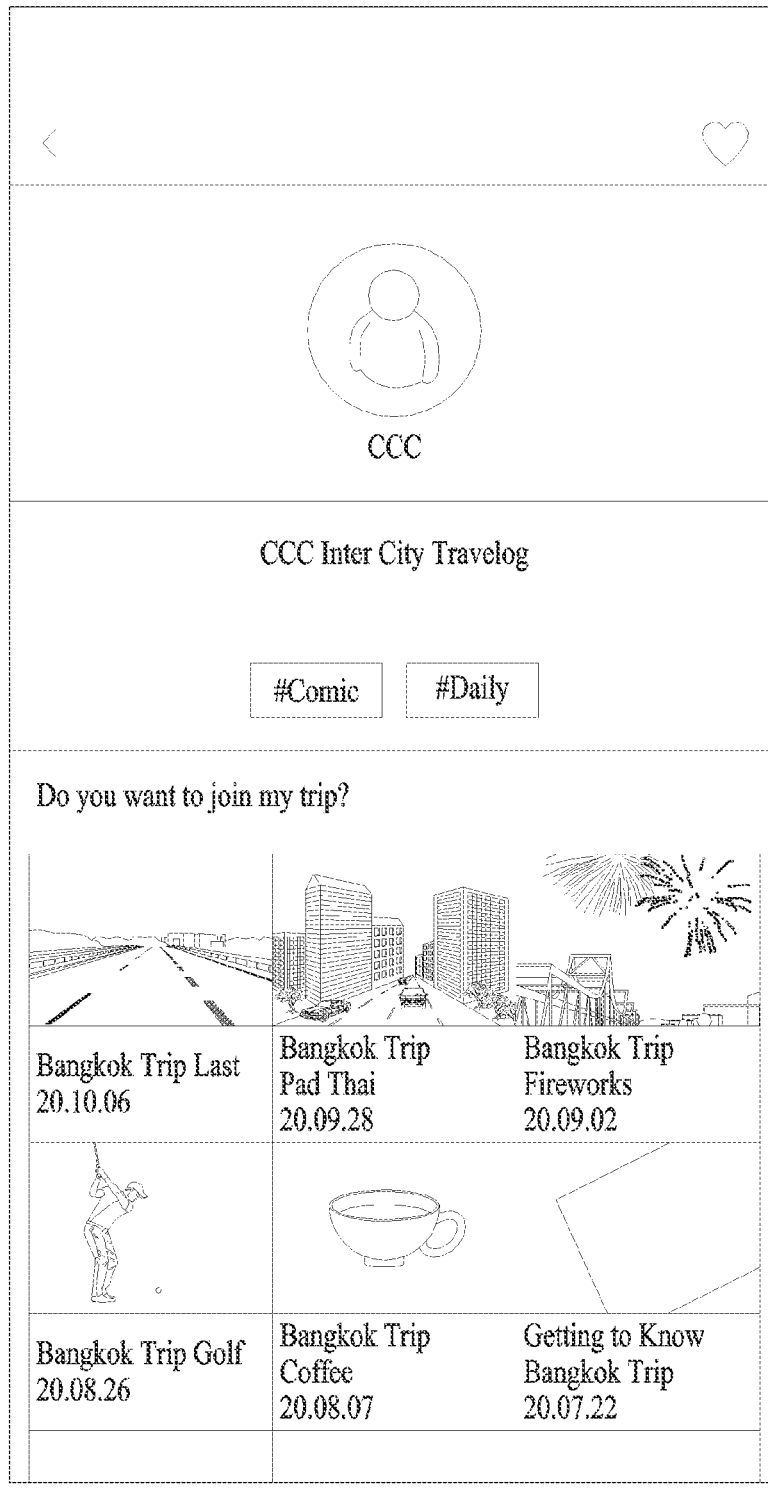

For example, in response to the selective input of the interfacing object 440 received from the second user terminal, the second user terminal accesses the webpage set so as to correspond to the first public profile and the interface screen displayed on the second user terminal may be switched to a website screen illustrated in FIG. 7A or 7B.

FIGS. 8A to 8E are views illustrating a user interface for creating a profile corresponding to a user account.

Figure 8A:
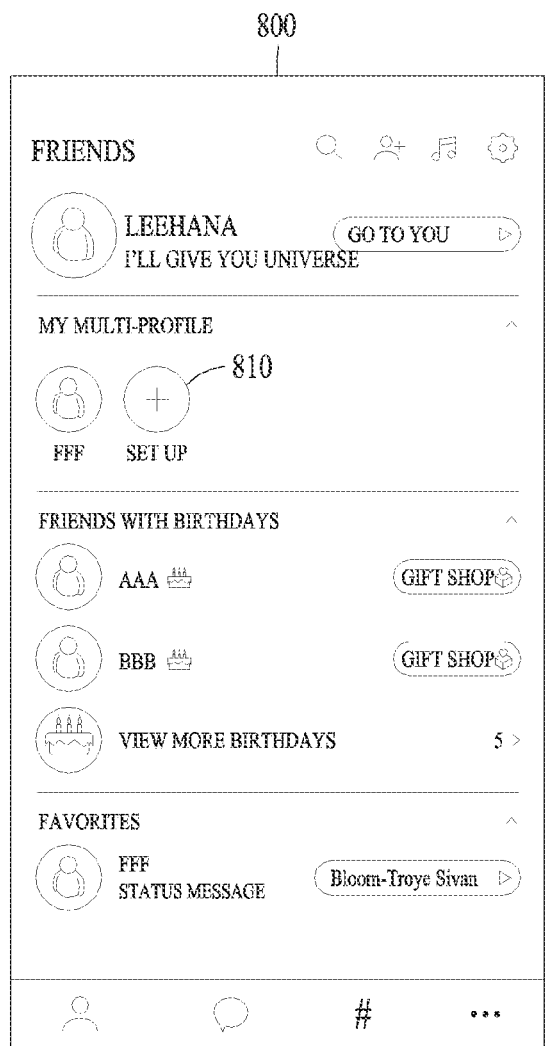
FIGS. 8A to 8E are views illustrating a user interface for creating a public profile according to an example embodiment.

Referring to FIG. 8A, the server may provide a UI 800 for the service to the user terminal and the user may request the server to create a profile using a button 810 for creating a profile included in the UI 800. As described above, a plurality of profiles corresponding to a single user account may be created.

Figure 8B:
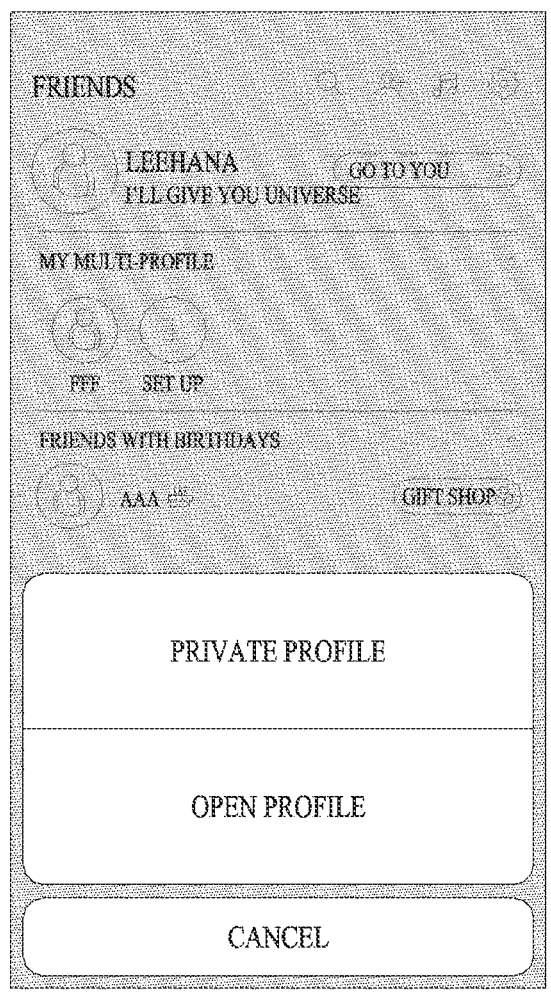
Figure 8C:
Figure 8D:
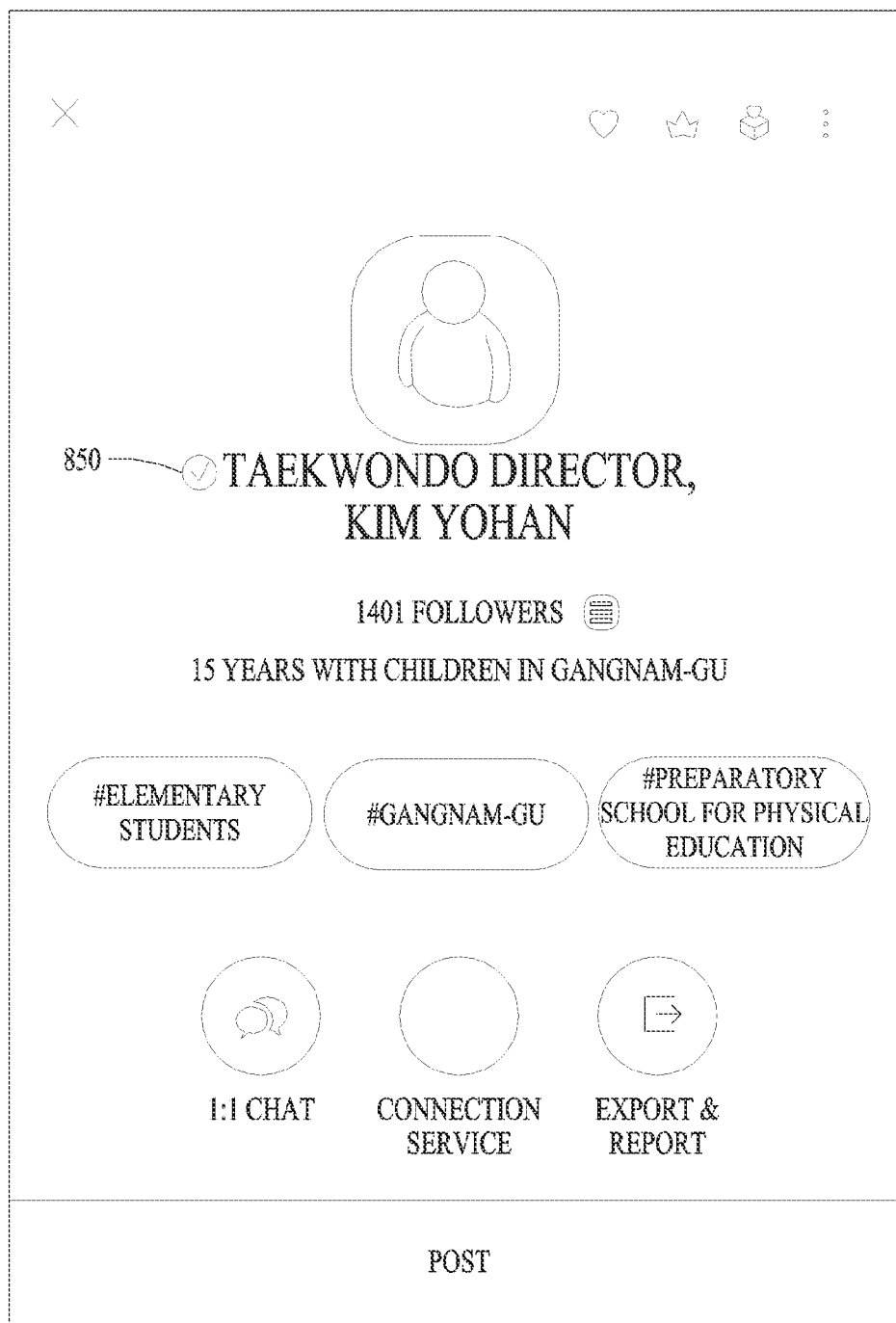
Figure 8E:
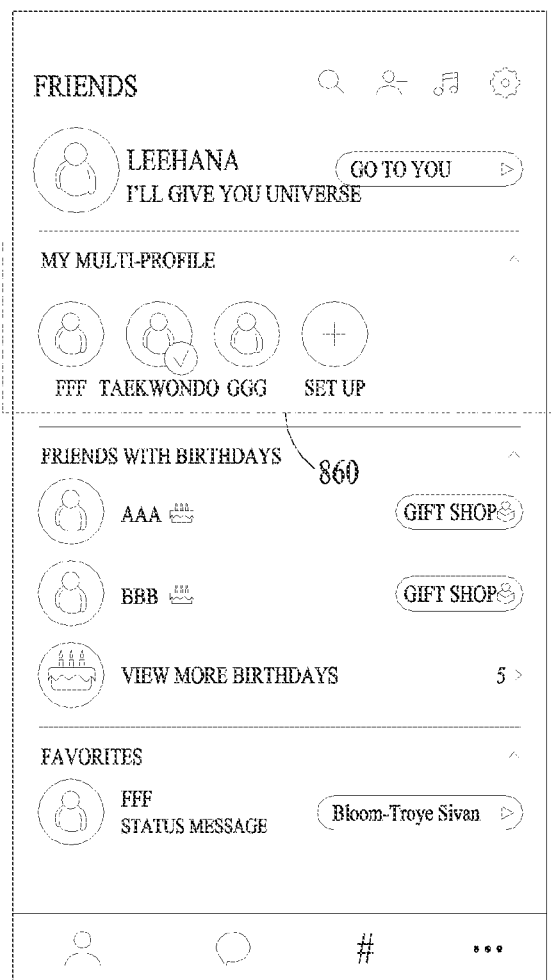

Referring to FIG. 8B, when the creation of the profile is requested, the user terminal may select a type of profile to be created. Referring to FIG. 8C, when the creation of an open profile is requested, a UI 801 for a setting of an open profile may be provided. The UI for a setting of an open profile may include an area 820 of setting identification information such as a profile name, a profile photo, and a profile introduction included in the profile, an area 830 of setting a tag related to the profile, and an area 840 of setting a participation permission option for a chatroom created using the profile and a search permission option related to the profile. As described above, the public profile is a profile including certificate information corresponding to the user account, among the open profiles and the public profile may be created by adding certificate information based on the certification of the user account to the open profile. FIG. 8D is a view illustrating a UI of a public profile of a user account provided to a user terminal logged in with the user account. Referring to FIG. 8D, an interfacing object 850 indicating that the profile is certified may be added to the UI of the public profile. Referring to FIG. 8E, the interfacing object indicating that the profile is certified may be displayed in the area 860 in which the profile(s) corresponding to the user account included in the UI for the service is (are) displayed so as to correspond to the certified profile.

The apparatus according to the example embodiment is an apparatus which performs the above-described profile management method and may include a server and a terminal. The apparatus includes a processor, a memory, and an input/output device.

The processor of the apparatus according to the example embodiment may perform at least one method described above with reference to FIGS. 1 to 8E. The memory may be a volatile memory or a non-volatile memory and store information relating to a profile management method. According to an example embodiment, the memory may store a program in which the above-described profile management method is implemented and the processor may execute the program stored in the memory and control the apparatus.

The apparatus according to the example embodiment may receive an input from the user through an input/output device and provide output data to interact with the user and may be connected to an external device (for example, another terminal or network) and exchange data.

The example embodiments described above may be implemented by a hardware component, a software component, and/or a combination of the hardware component and the software component. For example, the device, the method, and the components described in the example embodiments may be implemented, for example, using a general purpose computer or a special purpose computer such as a processor, a controller, an arithmetic logic unit (ALU), a digital signal processor, a microcomputer, a field programmable gate array (FPGA), a programmable logic unit (PLU), a microprocessor, or any other device which executes or responds instructions. The processing device may perform an operating system (OS) and a software application which is executed on the operating system. Further, the processing device may access, store, manipulate, process, and generate data in response to the execution of the software. For ease of understanding, it may be described that a single processing device is used, but those skilled in the art may understand that the processing device includes a plurality of processing elements and/or a plurality of types of processing element. For example, the processing device may include a plurality of processors or include one processor and one controller. Further, another processing configuration such as a parallel processor may be allowed.

The software may include a computer program, a code, an instruction, or a combination of one or more of them and configure the processing device to be operated as desired or independently or collectively command the processing device. The software and/or data may be permanently or temporarily embodied in an arbitrary type of machine, component, physical device, virtual equipment, computer storage medium, or device, or signal wave to be transmitted to be interpreted by a processing device or provide command or data to the processing device. The software may be distributed on a computer system connected through a network to be stored or executed in a distributed manner. The software and data may be stored in a computer readable recording medium.

The method according to the example embodiment may be implemented as a program instruction which may be executed by various computers to be recorded in a computer readable medium. The computer readable medium may store the program instruction, a data file, or a data structure alone or in combination and the program instruction stored in the medium may be specifically designed and configured for the example embodiment or known to those skilled in the art of computer software. Examples of the computer readable recording medium include magnetic media such as a hard disk, a floppy disk, or a magnetic tape, optical media such as a CD-ROM or a DVD, magneto-optical media such as a floptical disk, and a hardware device which is specifically configured to store and execute the program instruction such as a ROM, a RAM, and a flash memory. Examples of the program instruction include not only a machine language code which is created by a compiler but also a high level language code which may be executed by a computer using an interpreter.

The above-described hardware device may operate as one or a plurality of software modules in order to perform the operation of the example embodiment and vice versa.

As described above, although example embodiments have been described by limited drawings, those skilled in the art may apply various technical modifications and changes based on the above description. For example, even when the above-described techniques are performed by different order from the described method and/or components such as systems, structures, devices, or circuits described above are coupled or combined in a different manner from the described method or replaced or substituted with other components or equivalents, the appropriate results can be achieved.

Therefore, other implements, other embodiments, and equivalents to the claims are within the scope of the following claims.

What is claimed is:

1. A user profile management method which is performed in a server, comprising:
    creating a public profile of a first user account, the public profile of the first user account including certificate information corresponding to the first user account;
    creating a chatroom in which a participation permission option related to the certificate information is set by a user of the first user account to allow at least one other user account to enter the chatroom with a public profile having certificate information corresponding to the participation permission option;
    confirming a participation right of a second user account that requests participation in the chatroom by determining whether a public profile for participation in the chat room of the second user account includes the certificate information corresponding to the participation permission option; and
    allowing the second user account whose participation right is confirmed to participate in the chatroom;
    wherein the public profile for participation in the chat room of the second user account corresponds to an open type profile that is distinguished from a private type profile requiring real-name information; and
    wherein the public profile of the first user account includes anonymous information corresponding to the first user account.

2. The user profile management method according to claim 1, wherein the participation permission option includes at least one of an option of permitting participation with a public profile including predetermined certificate information and an option of permitting participation with an arbitrary profile.

3. The user profile management method according to claim 1, wherein the second user account whose participation right is confirmed participates in the chatroom with a profile corresponding to the participation permission option, among at least one profile of the second user account.

4. The user profile management method according to claim 1, wherein the creating of the public profile of the first user account includes:
    adding an interfacing object indicating that the public profile of the first user account is certified to a user interface on which the public profile of the first user account is displayed.

5. The user profile management method according to claim 1, wherein the certificate information includes at least one of certified identity information, certified qualification information, and certified affiliation information.

6. A user profile management method which is performed in a server, comprising:
    creating a public profile of a first user account, the public profile of the first user account including certificate information corresponding to the first user account;
    receiving a search request based on the certificate information from a second user terminal logged in with a second user account;
    confirming a search right of the second user account for the public profile of the first user account, based on a search permission option related to the certificate information set in the public profile of the first user account, the search permission option set by a user of the first user account to allow searches of the public profile of the first user account by at least one other user account having a public profile having certificate information corresponding to the search permission option, and providing the public profile of the first user account to the second user terminal as the search right of the second user account is confirmed;

wherein the search right of the second user account is confirmed when a public profile having the certificate information corresponding to the search permission option is included in a plurality of profiles of the second user account, wherein the plurality of profiles includes at least one of an open type profile and at least one of a private type profile, and the open type profile is distinguished from the private type profile requiring real-name information, and wherein the public profile of the first user account includes anonymous information corresponding to the first user account.

7. The user profile management method according to claim 6, further comprising:

receiving a chatting request with the first user account from the second user terminal, based on the public profile of the first user account; and creating a chatroom including the first user account and the second user account based on the chatting request, wherein the first user account participates in the chatroom with the public profile of the first user account.

8. The user profile management method according to claim 6, further comprising:

receiving an input for at least one tag related to the certificate information from the first user terminal logged in with the first user account; and adding the input tag to the public profile.

9. The user profile management method according to claim 8, wherein the receiving of a search request based on the certificate information includes:

receiving a request for searching the tag which is added to the public profile of the first user account.

10. The user profile management method according to claim 6, wherein the search permission option includes at least one of an option of permitting a search by arbitrary another user account and an option of permitting a search by another user account corresponding to the certificate information.

11. A user profile management method performed in a user terminal which is logged in with a user account, the method comprising:

requesting a server to create a public profile including certificate information of the user account;

setting a search permission option related to the certificate information to the public profile of the user account, the search permission option set by a user of the user account to allow searches of the public profile of the user account by at least one other user account having a public profile having certificate information corresponding to the search permission option;

setting a participation permission option related to the certificate information to a chatroom created using the public profile of the user account, the participation permission option set by the user of the user account to allow at least one other user account to participate in the chatroom with a public profile having certificate information corresponding to the search permission option;

confirming a participation right of a second user account that requests participation in the chatroom by determining whether a public profile for participation in the chat room of the second user account includes the certificate information corresponding to the participation permission option; and allowing the second user account whose participation right is confirmed to participate in the chatroom, wherein the public profile of the user account includes anonymous information corresponding to the user account.

12. The user profile management method according to claim 11, wherein the requesting of creation of a public profile of the user account includes:

performing certification to prove an identity corresponding to the user account through the server; and requesting the server to create a public profile including the certified identity information based on the certification.

13. The user profile management method according to claim 11, wherein the requesting of creation of a public profile of the user account includes:

performing certification to prove an qualification corresponding to the user account through the server; and requesting the server to create a public profile including the certified qualification information based on the certification.

14. The user profile management method according to claim 11, wherein the requesting of creation of a public profile of the user account includes:

performing certification to prove an affiliation corresponding to the user account through the server; and requesting the server to create a public profile including the certified affiliation information based on the certification.

15. A computer program stored in a medium to be coupled to hardware to execute the method according to claim 1.

16. A server, comprising:

at least one processor configured to:

create a public profile of a first user account, the public profile including certificate information corresponding to the first user account, create a chatroom in which a participation permission option related to the certificate information is set by a user of the first user account to allow at least one other user account to enter the chatroom with a public profile having a certificate information corresponding to the participation permission option, confirm a participation right of a second user account that requests participation in the chatroom, by determining whether a public profile having the certificate information corresponding to the participation permission option is included in a plurality of profiles of the second user account, wherein the plurality of profiles include at least one of an open type profile and at least one of a private type profile, wherein the open type profile is distinguished from the private type profile requiring real-name information; and allow the second user account whose participation right is confirmed to participate in the chatroom, wherein the public profile of the first user account includes anonymous information corresponding to the first user account.

17. A server, comprising:
at least one processor configured to:
create a public profile of a first user account, the public profile of the first user account including certificate information corresponding to the first user account,
receive a search request based on the certificate information from a second user terminal logged in with a second user account,
confirm a search right of the second user account for the public profile of the first user account, based on a search permission option related to the certificate information set in the public profile of the first user account, the search permission option set by a user of the first user account to allow searches of the public profile of the first user account by at least one other user account having a public profile having a certificate information corresponding to the search permission option, and
provide the public profile of the first user account to the second user terminal as the search right of the second user account is confirmed,
wherein the search right of the second user account is confirmed when a public profile having the certificate information corresponding to the search permission option is included in a plurality of profiles of the second user account,
wherein the plurality of profiles includes at least one of an open type profile and at least one of a private type profile, wherein the open type profile is distinguished from the private type profile requiring real-name information, and
wherein the public profile of the first user account includes anonymous information corresponding to the first user account.

18. A user terminal which is logged in with a user account, comprising:
at least one processor configured to:
request a server to create a public profile including certificate information of the user account,
set a search permission option related to the certificate information to the public profile of the user account, the search permission option set by a user of the user account to allow searches of the public profile of the user account by at least one other user account having a public profile having a certificate information corresponding to the search permission option,
set a participation permission option related to the certificate information to a chatroom created using the public profile of the user account, the participation permission option set by the user of the first user account to allow at least one other user account to enter the chatroom with a public profile having a certificate information corresponding to the participation permission option;
confirming a participation right of a second user account that requests participation in the chatroom by determining whether a public profile for participation in the chat room of the second user account includes the certificate information corresponding to the participation permission option; and
allowing the second user account whose participation right is confirmed to participate in the chatroom;
wherein the search right is confirmed when a public profile having the certificate information corresponding to the search permission option is included in a plurality of profiles of a first user account that requests participation in the chatroom,
wherein the participation right is confirmed when a public profile having the certificate information corresponding to the participation permission option is included in a plurality of profiles of a second user account that requests search of the public profile of the user,
wherein the plurality of profiles include at least one of an open type profile and at least one of a private type profile, wherein the open type profile is distinguished from the private type profile requiring real-name information, and
wherein the public profile of the user account includes anonymous information corresponding to the user account.

* * * * *